(12) United States Patent
College

(10) Patent No.: US 8,545,578 B2
(45) Date of Patent: Oct. 1, 2013

(54) SYSTEM AND METHOD FOR USING BOARD PLANT FLUE GASES IN THE PRODUCTION OF SYNGAS

(75) Inventor: John College, Valley Forge, PA (US)

(73) Assignee: CertainTeed Gypsum, Inc., Tampa, FL (US)

( * ) Notice: Subject to any disclaimer, the term of this patent is extended or adjusted under 35 U.S.C. 154(b) by 1005 days.

(21) Appl. No.: 12/497,093

(22) Filed: Jul. 2, 2009

(65) Prior Publication Data

US 2010/0170155 A1 Jul. 8, 2010

Related U.S. Application Data

(60) Provisional application No. 61/077,880, filed on Jul. 3, 2008.

(51) Int. Cl.
*B01J 7/00* (2006.01)
*F26B 21/06* (2006.01)
*F26B 19/00* (2006.01)

(52) U.S. Cl.
USPC .......... 48/61; 34/72; 34/209; 34/210; 34/215; 34/218

(58) Field of Classification Search
USPC .................. 48/61; 34/72, 209–218
See application file for complete search history.

(56) References Cited

U.S. PATENT DOCUMENTS

| | | | |
|---|---|---|---|
| 2,440,940 A | 5/1948 | Galusha | |
| 3,482,327 A * | 12/1969 | Dutcher | 34/386 |
| 3,866,411 A | 2/1975 | Marion et al. | |
| 4,917,024 A | 4/1990 | Marten et al. | |
| 4,963,513 A | 10/1990 | Marten | |
| 5,517,815 A | 5/1996 | Fujioka et al. | |
| 5,724,805 A | 3/1998 | Golomb et al. | |
| 6,333,015 B1 | 12/2001 | Lewis | |
| 6,622,470 B2 | 9/2003 | Viteri et al. | |
| 6,637,183 B2 | 10/2003 | Viteri et al. | |
| 6,790,383 B2 | 9/2004 | Kim | |
| 6,832,485 B2 | 12/2004 | Sugarmen et al. | |
| 6,877,322 B2 | 4/2005 | Fan | |
| 6,910,335 B2 | 6/2005 | Viteri et al. | |
| 2003/0236311 A1* | 12/2003 | Melnichuk et al. | 518/726 |
| 2004/0123601 A1 | 7/2004 | Fan | |
| 2007/0172413 A1 | 7/2007 | College | |

FOREIGN PATENT DOCUMENTS

WO 2004027220 A1 4/2004

OTHER PUBLICATIONS

Florida Biomass Consortium, "Using High Efficiency Biomass Gasification for Industrial Drying," a grant proposal submitted to the Florida Renewable Energy Technologies Grant Program for Renewal Energy Projects in 2006 and awarded in Feb. 2007; downloaded from http://www.floridadep.org/energy/energyact/files/grant/2006%20award%20winners/Original%20Proposals/fbec.pdf, p. 4, Objective 1, cited in PCT/US2009/049585 on Aug. 19, 2009.

* cited by examiner

*Primary Examiner* — Matthew Merkling
(74) *Attorney, Agent, or Firm* — GrayRobinson, P.A.; Michael J. Colitz, III

(57) ABSTRACT

Disclosed is an apparatus and method for capturing the hot humid gases from a gypsum board dryer and utilizing those gases in the production of a synthetic gas (referred to as "syngas"). The syngas produced can then be utilized within a gypsum board plant to reduce the amount of natural gas needed.

6 Claims, 3 Drawing Sheets

SYSTEM AND METHOD FOR USING BOARD PLANT FLUE GASES IN THE PRODUCTION OF SYNGAS

CROSS REFERENCE TO RELATED APPLICATIONS

This application claims priority to application Ser. No. 61/077,880 filed on Jul. 3, 2008 and entitled "System and Method For Using Board Plant Flue Gases In The Production Of Syngas." The contents of this application are fully incorporated by reference herein.

BACKGROUND OF THE INVENTION

1. Field of the Invention

This invention relates to a method for increasing the efficiency of a board plant. More particularly, the present invention relates to utilizing the water vapor and carbon dioxide present in the flue gas of a board plant to produce syngas.

2. Description of the Background Art

In the production of gypsum board, direct fired natural gas burners are used to deliver heat directly to wet gypsum boards as they continuously pass through a dryer. Typically gypsum boards are 25-33% moisture at the "wet" end of the dryer and less than 1% moisture at the dry end. Almost all of the water contained in the wet board is evaporated out of the board through the heat delivered from the combustion of the natural gas in a natural gas burner. There is direct contact between this gas and humidified recirculated gas which is drawn over the wet gypsum boards causing them to heat up and allowing the evaporation of the water. As a result of the evaporation, the water content of the air within the dryer is often 0.3 to 0.4 pounds of water for every pound of air. This water is passed up the stack of the board plant and out into the environment.

The evaporation of water from the wet boards is energy intensive. Most of this energy is supplied from natural gas. The natural gas is burned to produce thermal energy required for drying the gypsum board. Modern gypsum board plants require around 200,000,000 Btu/hr. or approximately 200,000 cubic ft. of natural gas per hour. This is a tremendous amount of natural gas.

The large amount of natural gas required is problematic due to the instability in the natural gas market. High demand in 2005 to 2006 caused gas pricing to nearly quadruple in a few years. In recent years, gas pricing has peaked at about $13.50/million BTU. By contrast, energy prices for coal/pet coke and biomass were generally less than $2.40 to $4.8/million BTU. Biomass has an additional advantage in that many conservation minded communities are now charging tipping fees to encourage the beneficial use of yard wastes and tree trimmings. Other energy sources, such as coal, wood and waste fuels have also become more economically viable in recent years.

Thus, there exists a need in the art for ways of reducing the amount of natural gas used in board dryers. And there likewise exists a need in the art for board drying methods that utilize less expensive energy sources, such as biomasses, coal, wood or waste fuels. Gasification is a known process whereby feed materials such as biomass, coal, wood, or waste fuels are used to produce synthesis gas, or syngas. The background art illustrates several different gasification techniques.

For example, U.S. Pat. No. 6,877,322 to Fan discloses the recycling of $CO_2$ to be used in gasification processes. The $CO_2$ is in the form of compressed exhaust gas generated from a gas turbine compressor system. $O_2$ and steam are also constituents of the exhaust gas which is fed into the gasifier. The exhaust gas is fed to the gasifier via a conductor (for example, a hose or tubing). As the constituents react in the gasifier, syngas is produced. The syngas comprises carbon monoxide (CO) and hydrogen ($H_2$).

Furthermore, U.S. Pat. No. 5,724,805 to Golomb discloses the recovery of $CO_2$ from a gas turbine arranged to combust a fuel. Substantially pure oxygen gas and $CO_2$ are fed into a gas turbine to produce an exhaust gas comprising water and carbon dioxide. The gas turbine exhaust is used to generate steam in the heat recovery steam generator ("HRSG") for power generation in a steam turbine. A portion of the steam generated from the HRSG is used as steam input for coal gasification. The flue gas from the HRSG is cooled and water vapor is removed; what is left is pure $CO_2$ which is split into two streams. One stream is recycled and the other is removed from the system as liquid $CO_2$. Ambient air is separated into its components, wherein $O_2$ is partially (one stream) diverted into a coal gasifier, where coal, $O_2$ and steam are converted into synthesis gas. The other $O_2$ stream is sent to a gas turbine combustor, wherein the combustion products are $CO_2$ and $H_2O$.

U.S. Pat. No. 5,517,815 to Fujioka discloses a coal gasification generator wherein a high temperature combustion gas is produced from a coal gasifying furnace and supplied to a gas turbine. The gas turbine drives a power generating unit, wherein the exhaust gas produced is fed to a boiler. The water vapor produced from the boiler is heated by a heat exchanger and is subsequently supplied to a gasifying furnace as a gas.

Additionally, U.S. Pat. No. 4,963,513 to Marten discloses a process by which coal is reacted in a gasification zone in the presence of an oxygen and sulfur containing atmosphere. From this process, carbonaceous char and a crude coal gas stream is produced. The carbonaceous char and gypsum may be combined to form a feed mixture such that they are reacted in a reaction zone under reducing conditions to produce a sulfur-dioxide-containing gas stream which contains weaker $SO_2$, which is removed from the reaction zone. This sulfur-dioxide gas stream can be recycled back to the coal gasification zone where it can be mixed with air to provide the oxygen-equivalent required for the coal gasification.

Finally, another well known gasification technique was originally developed by Albert L. Galusha and is now known as Wellmen-Galusha gasification. This process is generally described in U.S. Pat. No. 2,440,940 to Galusha.

Although each of the above referenced inventions achieves its respective objective, none of the background art involves utilizing gasification techniques in conjunction with a board dryer. More specifically, none of the background art discloses utilizing the flue gas from a gypsum board plant as a constituent of gasification.

SUMMARY OF THE INVENTION

It is, therefore, one of the objects of this invention to recycle flue gasses from a board dryer and utilize those recycled gasses in gasification.

It is a further object of the present invention to utilize flue gasses from a board dryer to supply the heated water vapor necessary for gasification.

It is yet a further object of this invention to utilize the carbon dioxide ($CO_2$) from the flue gas of a board dryer in a gasification reaction and, thereby, increase the energy content of the resulting syngas.

It is another object of this invention to utilize the syngas produced from gasification as a replacement for the natural gas this is otherwise used in a board dryer.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
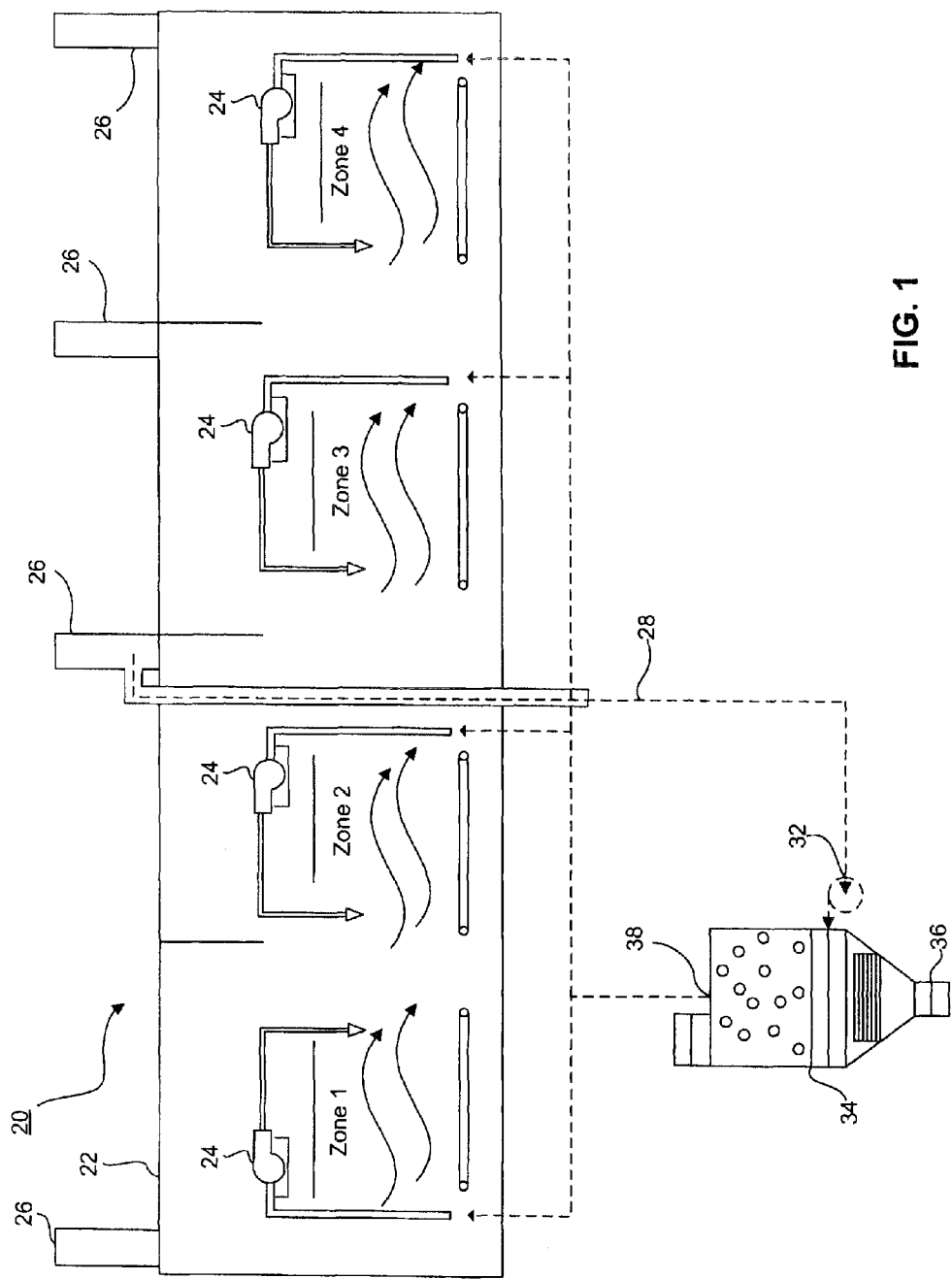
FIG. 1 is a schematic diagram illustrating a multi stack board plant in accordance with the present invention.

The present invention relates to utilizing the byproduct of a board plant in the production of a synthesis gas (referred to as "syngas"). The syngas produced by way of the present invention can then be utilized within the board plant to reduce the amount of natural gas needed. The method utilizes the heated water vapor ($H_2O$) and carbon dioxide ($CO_2$) found within the flue gas of a board dryer. The $H_2O$ and $CO_2$ are used in a gasification process to yield syngas.

Gasification is a process whereby carbon, from feed materials such as coal, wood, biomasses, or waste fuels is converted into high temperature water vapor, carbon monoxide (CO), and hydrogen (H). This process involves reacting feed materials with oxygen at high temperatures. Suitable waste fuels include anthracite culm, coal plant tailings, or gob piles. The gas produced from the gasification process is syngas, which can serve as a substitute for more conventional gases, such as natural gas. Syngas typically has an energy content of between 100-500 BTU per cubic foot. Gasification can be carried out at either elevated or atmospheric pressures.

Water vapor is a critical element necessary for converting carbon into hydrogen gas ($H_2$), as can be seen in the primary gasification reaction:

$$C+H_2O \rightarrow CO+H_2 \qquad \text{(Equation 1)}$$

The reaction of Equation 1 typically occurs at a temperature of between 1500-1800° F.

The present invention utilizes water vapor from the stack of a conventional board plant to supply the $H_2O$ needed for the gasification reaction of Equation 1. Utilizing these board plant vapors is advantageous because the evaporated water is already in gaseous form and is, therefore, ready to react with the hot carbon. Also, an energy savings is realized in the gasification reaction because the vapor leaving the board plant is already heated, thereby eliminating the need to independently heat the vapor. The standard methods for water evaporation and air saturation or steam injection are not required.

Another important component in gasification is carbon dioxide ($CO_2$). Namely, the energy content of the resulting syngas can be increased by reacting carbon dioxide with carbon in accordance with the following equation:

$$CO_2+C \rightarrow 2CO \qquad \text{(Equation 2)}$$

As with Equation 1, this reaction occurs at elevated temperatures (in order to maintain the temperature at 1500 of some of the carbon must be completely burned). The additional carbon monoxide (CO) produced via Equation 2 can be added to the syngas to slightly improve the BTU content. The additional carbon dioxide ($CO_2$) needed for Equation 2 is likewise found within the flue gas of a board plant. Namely, the carbon dioxide ($CO_2$) is recycled along with the water vapor ($H_2O$). A typical board plant produces an off gas with a $CO_2$ content of 3-6% on a dry basis. Carbon dioxide ($CO_2$) is also produced during the combustion of syngas.

A typical syngas produced in accordance with the present invention would have the constituents listed below in Table 1. However, this listing is representative of only one type of syngas that can be produced in accordance with the present method. The BTU content of this resulting gas would be between 100-210 BTU per cubic foot for an air blown system (and between 500-1000 BTU per cubic foot for an oxygen blown system).

TABLE 1

| | |
|---|---|
| $CO_2$ | 3-5% |
| $H_2$ | 8-15% |
| CO | 30-35% |
| $C_1$-$C_5$ | Less than 1% |
| $O_2$ | Less than 1% |
| $N_2$ | Balance |

Thus, the present invention finds an advantageous use for one of the largest by-products in a gypsum board plant—the heated water vapor found in flue gases. For every two tons of gypsum board produced by a plant, one ton of water must be evaporated in the board dryers. The water content of the dryer is typically 0.3 to 0.4 lbs. of water ($H_2O$) for everyone 1 lb of air. This means that small board plants release approximately 25 tons of water per hour while large ones can release over 60 tons per hour. Moreover, the dryer typically produces water at elevated temperatures due to the combustion of natural gas. Traditionally, the water vapor by-product is vented to the atmosphere and is not recovered. The present invention, instead of releasing this water vapor into the atmosphere recovers this gas and effectively uses it in the production of syngas.

The system of the present invention saves tremendous amounts of energy. Namely, by recycling hot stack gas, as opposed to utilizing ambient air, a 100,000,000 BTU/hour gasifier would realize an energy savings of more than 13,000,000 BTU/hour. Even more energy savings are realized as the recycled carbon dioxide ($CO_2$) is used to improve the BTU content of the syngas as noted above. The process loop of the present invention saves water and energy in addition to making for a more efficient gasification.

An embodiment of the present invention 20 is illustrated in FIG. 1. As shown, a board dryer, such as a gypsum board dryer, is depicted with several dryer zones spaced in sequence. Each zone includes one or more burners 24 that are used to create the hot air necessary to dry the boards. In traditional dryers, burners 24 burn natural gas. The water evaporated in the dryer zones (Nos. 1-4) and is delivered up one or more stacks 26. Fans (not illustrated) are included within each stack to remove the moisture from within the dryer. In accordance with the invention, instead of delivering the high humidity vapor into the atmosphere, it is captured by way of a return line 28 and a blower 32.

Preferably, the gas is recovered from the second stack, as the second stack of a four zone dryer typically has the highest humidity and wet bulb temperatures. By utilizing the stack with the highest wet bulb temperatures, increased gasification efficiencies are realized. For example, the dry bulb temperature within the second stack may be in the range of 300° F. to 400° F., while the corresponding wet bulb temperature would be in the range of 170° F. to 200° F. This hot vapor, which includes a certain amount of carbon dioxide ($CO_2$), is thereby delivered to gasifier 34 via blower 32. As is known in the gasification arts, the gasifier 34 includes a lower outlet 36 for ash or other combustion by-products. An outlet line 38 is also included for the syngas produced by the gasification. In the preferred embodiment, this outlet line 38 delivers the syngas to one or more of the burners 24. In this manner, the syngas produced by the present invention can be used to replace the need for natural gas, which is typically used for the burners. The syngas can be treated via wet electrostatic precipitators or wet scrubbers to remove tars or wood oils. A compressor can also be included within line 38 (either before or after being treated) for compressing the syngas. Such compression allows the gas to be more easily transported to a desired destination.

Figure 2:
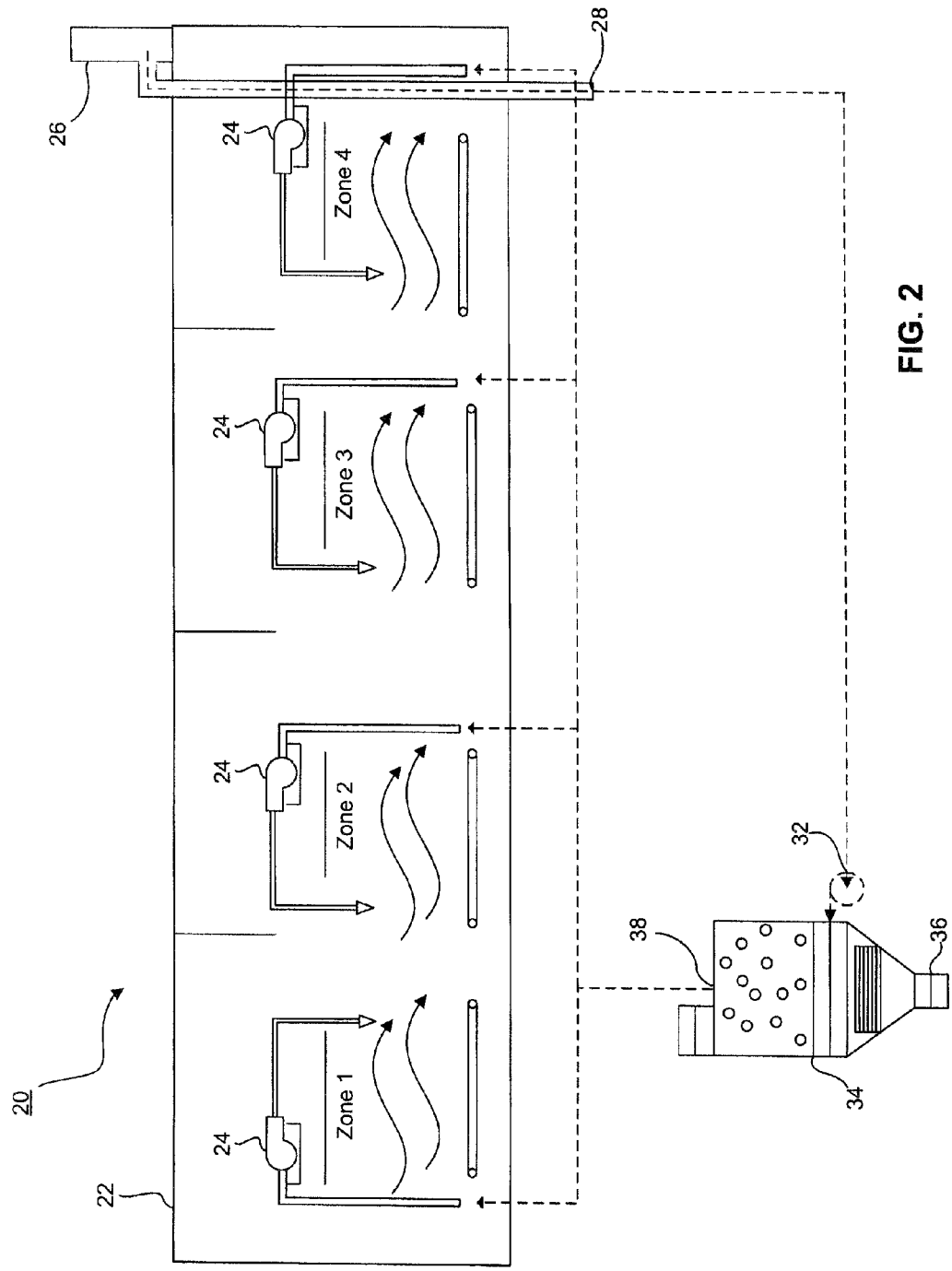
FIG. 2 is a schematic diagram illustrating a single stack board plant in accordance with the present invention.

FIG. 2 is another embodiment of the present invention. This embodiment is the same as the primary embodiment, but a single stack is included in the final dryer zone. The dry bulb temperature within the single stack may be in the range of 200° F. to 230° F., while the corresponding wet bulb temperature would be in the range of 150° F. to 185° F.

Figure 3:
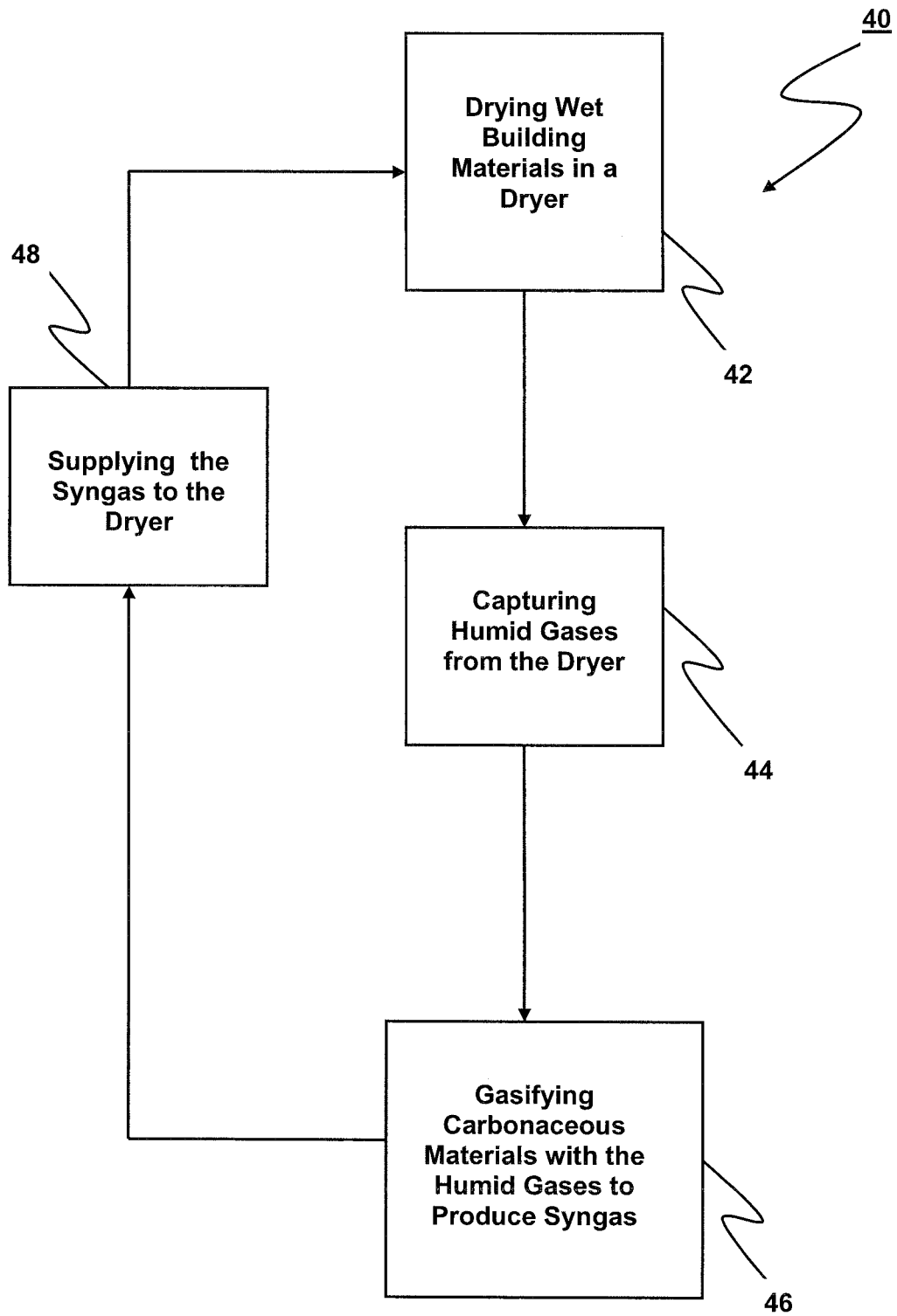
FIG. 3 is a flow chart illustrating the steps of the present invention.

FIG. 3 is a flow chart illustrating the various steps carried out in the method 40 of the present invention. These steps include an initial step 42 wherein a building material, such as a gypsum building board, is dried via a burner. This drying step creates a humid gas as the moisture from the building materials is evaporated. In the following step 44, the humid gases are captured and routed to a gasifier. During the gasification step 46, carbonaceous materials are burned along with the humid gases to yield synthesized gas or "syngas." Finally, the syngas can thereafter be supplied, at step 48, to the burner for additional drying. In this manner, the overall energy efficiency of the method 40 is increased.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the Invention.

Now that the invention has been described,

What is claimed is:

1. A system for producing a synthetic gas with increased energy content from the by-product of a gypsum board plant, the system comprising:
   a gypsum board dryer that includes a series of four sequentially spaced dryer zones, each dryer zone including a burner for heating a wet gypsum board and a stack to vent hot humid gases generated therefrom, the hot humid gases comprising water vapor and carbon dioxide ($CO_2$), the stacks of the first, third, and fourth dryer zones venting the hot humid gases into the atmosphere;
   a return line coupled to the stack of the second dryer zone, the return line capturing the hot humid gases from the second dryer zone;
   a gasifier for converting carbonaceous materials into a synthetic gas, the hot humid gases from the return line being supplied to the gasifier, wherein the water vapor from the hot humid gases reacts with the carbonaceous materials to produce synthetic gas, and further wherein the carbon dioxide ($CO_2$) from the hot humid gases reacts with the carbonaceous materials to produce carbon monoxide (CO), the carbon monoxide (CO) increasing the energy content of the synthetic gas;
   supply lines for delivering the synthetic gas with increased energy content from the gasifier to the burners, whereby the synthetic gas with increased energy content is used in drying the wet gypsum board.

2. The system as described in claim 1 further comprising a blower for delivering the hot humid gases from the return line to the gasifier.

3. The system as described in claim 1 wherein the gases within the stack of a selected dryer zone have a higher humidity and wet bulb temperature than the gases within the stacks of the other dryer zones.

4. The system as described in claim 1 wherein the supply lines deliver the synthetic gas to a plurality of different burners.

5. The system as described in claim 1 further comprising a compressor for compressing the synthetic gas produced by the gasifier.

6. The system as described in claim 1 wherein the burners are natural gas burners and wherein the synthetic gas replaces the need to utilize natural gas.

* * * * *